United States Patent
Nishikata

(10) Patent No.: US 6,452,738 B1
(45) Date of Patent: Sep. 17, 2002

(54) MAGNETIC RECORDING APPARATUS AND REPRODUCING APPARATUS

(75) Inventor: Yutaka Nishikata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/298,042

(22) Filed: Apr. 22, 1999

Related U.S. Application Data

(63) Continuation of application No. 08/133,291, filed on Oct. 8, 1993, now abandoned.

(30) Foreign Application Priority Data

Oct. 30, 1992 (JP) ............................................. 4-314249

(51) Int. Cl.$^7$ ............................................. G11B 5/596
(52) U.S. Cl. ..................................... 360/72.2; 360/48
(58) Field of Search ............................ 360/72.2, 72.1, 360/72.3, 27, 32, 48, 53, 49; 386/46, 68, 69

(56) References Cited

U.S. PATENT DOCUMENTS

| | | | |
|---|---|---|---|
| 4,688,116 A | * 8/1987 | Takahashi et al. | ......... 360/72.2 |
| 4,821,128 A | * 4/1989 | Inazawa et al. | ............ 360/72.2 |
| 4,899,232 A | * 2/1990 | Odaka et al. | ................. 360/48 |
| 5,003,411 A | * 3/1991 | Nagahara et al. | .......... 360/72.2 |
| 5,038,231 A | * 8/1991 | Harigaya et al. | ............. 360/69 |

* cited by examiner

Primary Examiner—David Hudspeth
Assistant Examiner—K Wong
(74) Attorney, Agent, or Firm—Frommer, Lawrence & Haug LLP; William S. Frommer; Darren M. Simon

(57) ABSTRACT

A magnetic recording and reproducing apparatus detects a first time code in hour-minute-second frame units recorded in a subcode data record area located in a predetermined position of each of the record tracks, which are obliquely formed on a magnetic tape, and detects a second time code in hour-minute units, representing high-order data of the first time code, recorded in a header portion of the subcode data record area. When a user specifies a desired position and starts a search at high speed, a high-speed search is performed up to a predetermined position according to the second time code (in hour-minute units) and then a reduced-speed search is performed from the predetermined position to the desired position according to the first time code (in hour-minute-second frame units).

4 Claims, 5 Drawing Sheets

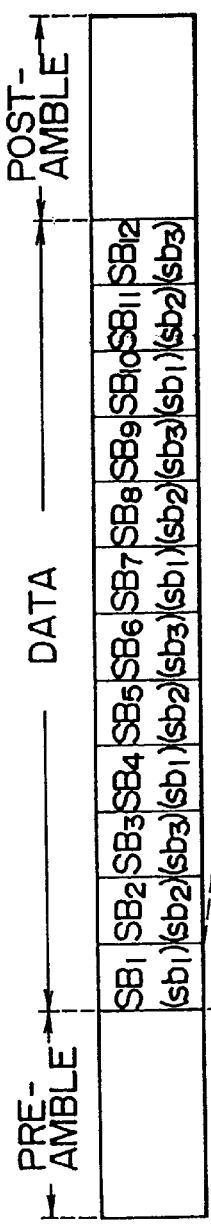
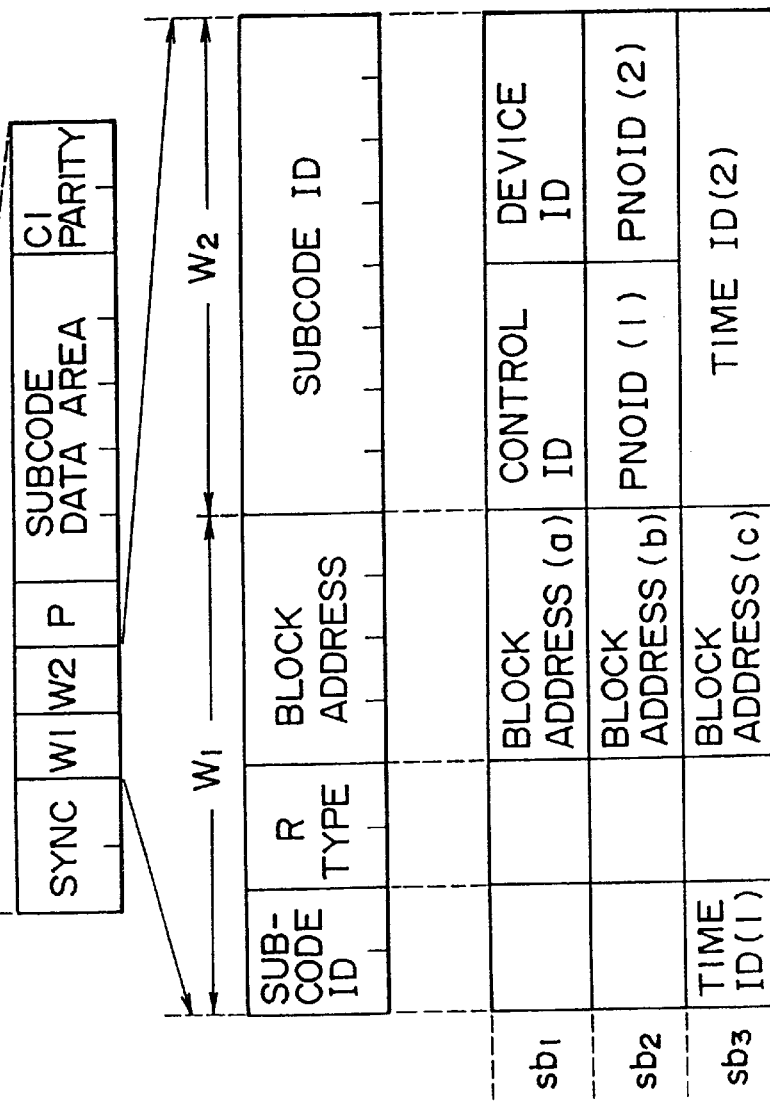
F I G. 2(a)
F I G. 2(b)
F I G. 2(c)
F I G. 2(d)

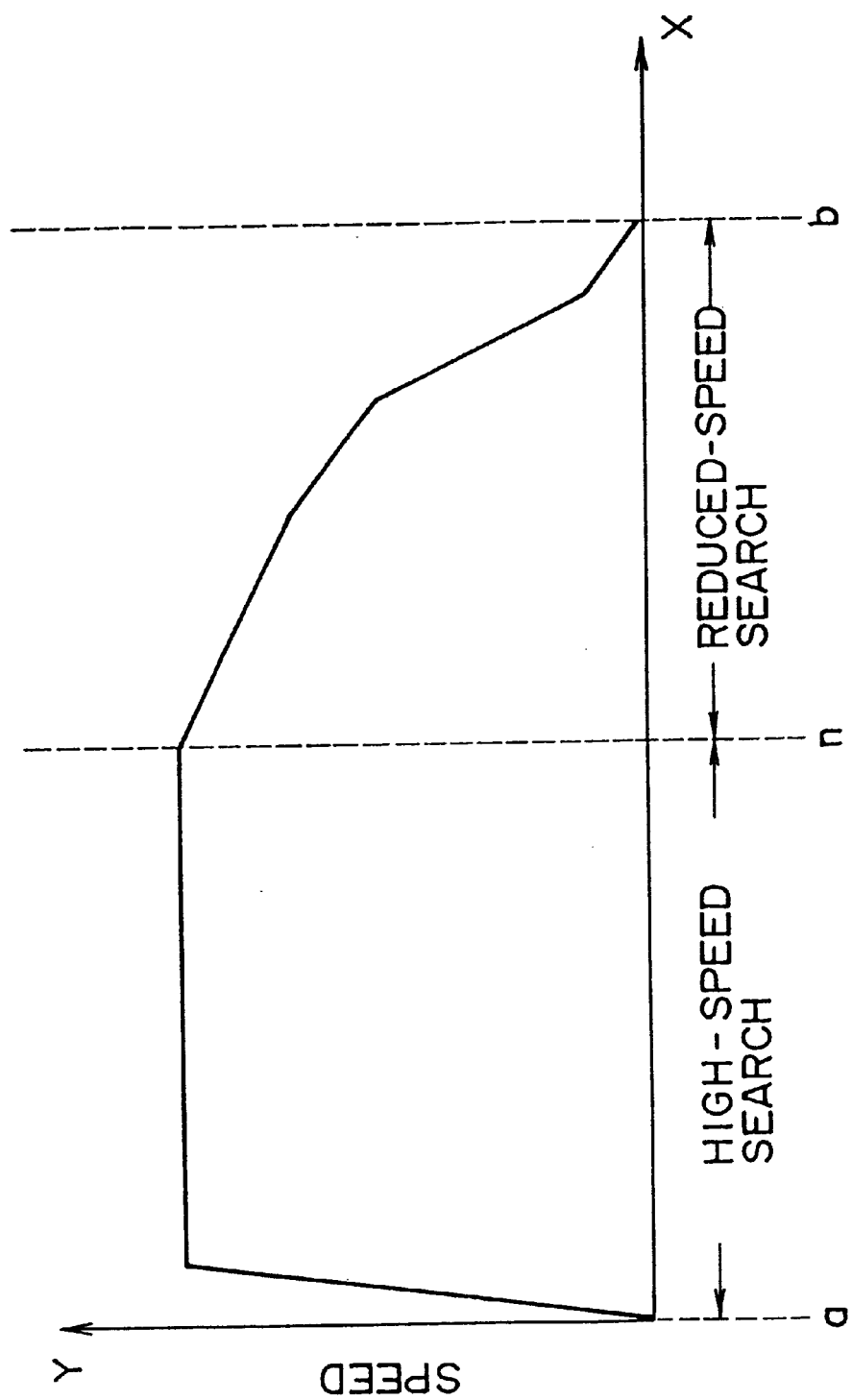

ing apparatus capable of
MAGNETIC RECORDING APPARATUS AND REPRODUCING APPARATUS This application is a continuation of Ser. No. 08/133,291 filed Oct. 8, 1993, now ABN.

DETAILED DESCRIPTION OF THE INVENTION

1. Field of the Invention

The present invention relates to a magnetic recording apparatus and a magnetic reproducing apparatus capable of a search for record data according to for example a time code, such as DAT, 8 mm VTR, and digital video VTR.

2. Description of the Related Art

In an apparatus such as an 8 mm VTR and a video tape recorder performing record/reproduction of information on a magnetic tape with a rotating head, the rotating head achieves the record/reproduction by abutting on the magnetic tape in the direction oblique to the length of the magnetic tape and forming oblique tracks on the magnetic tape.

FIG. 5(a) and FIG. 5(b) are diagrams showing a pattern of record tracks scanned by a VTR of a helical scan type in the normal reproduction and a waveform of an RF signal output from the VTR, in which A1 to A4 denote tracks with data of odd-numbered frames recorded therein scanned by a first rotating magnetic head, while B1 to B4 denote tracks with data of even-numbered frames recorded therein scanned by a second rotating magnetic head, and these tracks are formed in a direction oblique to the length of the magnetic tape.

The arrow R indicates the rotating direction of a rotating head provided with a pair of reproduce heads, not shown, and the arrow F indicates the traveling direction of the magnetic tape.

In this case, the rotating head makes a scan by sequentially abutting on the loci of the record tracks A1 to A4 and B1 to B4, and, thereby, the pair of reproduce heads read the recorded data and output an RF signal as shown in the waveform chart of FIG. 5(b).

FIG. 5(c) and FIG. 5(d) are diagrams corresponding to the above described FIG. 5(a) and FIG. 5(b) when varying-speed reproduction, such as triple-speed reproduction, is performed, in which H denotes a rotating head having a pair of reproduce heads C and D. In this case, the traveling speed of the magnetic tape is increased and, on account of its relationship with the rotating speed of the rotating head H, reading of tracks is performed skippingly. Further, the angle of abutment of the rotating head H on the magnetic tape becomes acute, and, hence, the surface of its abutment on the record track decreases and its shifting to the adjoining record track becomes faster.

Then, the data recorded in the tracks A1, B2, A4 disposed at intervals come to be output and the output RF waveform becomes as shown in a waveform chart of FIG. 5(d), that is, an RF signal in which data are not continuous from track to track is obtained.

When performing a high-speed search of programs or the like recorded in a magnetic tape or cuing, it is achieved by detecting a cuing signal, a time code, or the like recorded in a subcode area provided in a predetermined position of the record track.

FIG. 2 is a diagram showing an example of format of the subcode formed at a portion of the record track.

The subcode, as shown in FIG. 2(a), is formed of a preamble portion, a data portion, and a postamble portion. The data portion, in the case of this example, is divided, as shown in the diagram, into 12 sync blocks $SB_1$ to $SB_{12}$, which are properly used for three kinds of data, with the same data repeated four times.

FIG. 2(b) is a diagram showing data within one sync block of the data portion in an enlarged scale.

In this diagram, there are provided, in succession to a sync area SYNC, header areas W1 and W2 of the subcode, in which such data as the above mentioned cuing signal are recorded. The sync block further has a parity P of the header areas W1 and W2, a data area of the subcode with the above mentioned time code and the like recorded therein, and a parity C1 of the data area. Incidentally, a graduation shown in FIG. 2(b) indicates a length of one byte.

When a high-speed search at for example hundred-fold speed or above is performed on a tape with such a subcode recorded therein, then, what can be read is the data recorded in only a part of tracks, as was the case with the increased-speed reproduction described in FIG. 5(c) and FIG. 5(d), Hence, it becomes difficult to read the data in seven bytes in all including the parity C1. Thus, there has been a problem that it is thereby made difficult to read the time code for making a search for a position where the tape is to be stopped or to make cuing.

SUMMARY OF THE INVENTION

It is an object of the present invention to provide a magnetic recording apparatus and a magnetic reproducing apparatus capable of solving the above mentioned problem. In order to achieve this object, the present invention is adapted, by using, in the recording mode, generation means for generating address information of record data in absolute address and its time code, record means for recording a first time code in hour-minute-second units in a data portion of the subcode formed in the track, and record means for recording a second time code in hour-minute units, being high-order data of the first time code, in a header portion of the subcode in the record data format, to record the time codes, together with record data, in a magnetic tape.

In making a high-speed search for the contents recorded in the magnetic tape, the present invention is adapted, using detection means for detecting a first time code in hour-minute-second units recorded in a data portion of the subcode formed in the track and detection means for detecting a second time code in hour-minute units, being high-order data of the first time code, recorded in a header portion of the subcode in the record data format, to perform a high-speed search from the start to a predetermined position according to the second time code in hour-minute units recorded in the header portion of the subcode and perform a reduced-speed search from the predetermined position to the desired position according to the first time code in hour-minute-second units recorded in a data portion of the subcode.

Since the time code in hour-minute units is recorded in the header portion of the subcode in the magnetic tape, it is made possible to detect the elapsed time in units of minutes even while a search is being made at high speed, and thus a superhigh-speed search can be carried out.

BRIEF DESCRIPTION OF THE DRAWINGS

FIG. 2 is a diagram showing a format of the subcode for performing a high-speed search;

FIG. 3 is a diagram showing relationship between the searching speed and the current position of the magnetic tape;

DESCRIPTION OF THE PREFERRED EMBODIMENTS

An embodiment of magnetic recording apparatus and reproducing apparatus of the invention will be described below.

Figure 1:
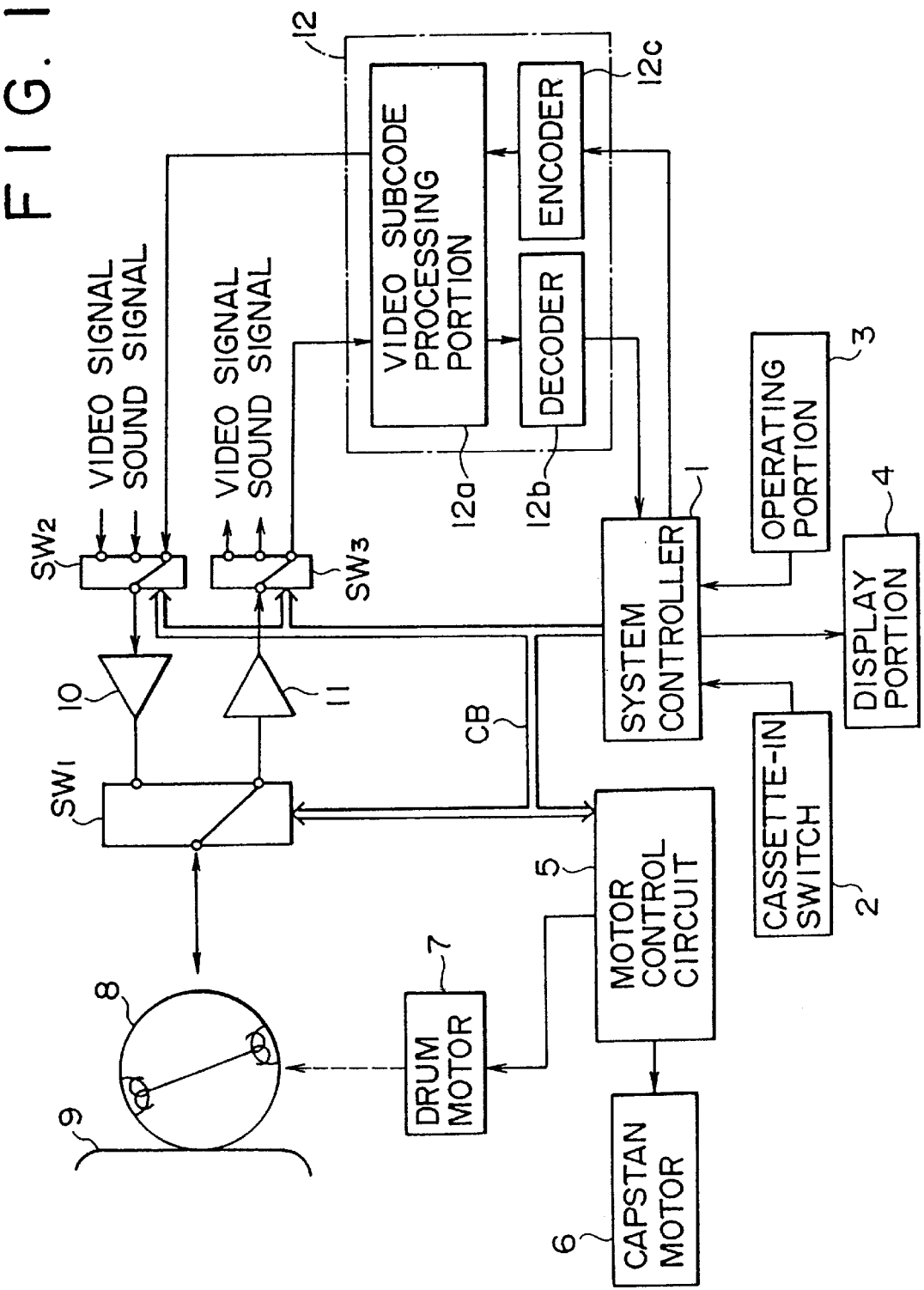
FIG. 1 is a block diagram showing an embodiment of a magnetic recording and reproducing apparatus of the present invention.

FIG. 1 is a diagram showing general structure of the magnetic recording and reproducing apparatus, in which a record/reproduce system of the subcode and a drive control system are specially shown in block diagram.

Referring to FIG. 1, reference numeral 1 denotes a system controller which accepts user's operating signals input from an operating portion 3, subcode data output from a decoder 12b within a later described data processing portion 12, and others, and performs switching of switches SW1, SW2, and SW3 and outputting of a control signal to a motor control circuit 5. The motor control circuit 5, receiving the control signal, supplies drive signals to a drum motor 7 for driving a rotating head 8 and a capstan motor 6 for traveling a magnetic tape 9, and executes such control as to keep their speed at predetermined numbers of revolutions.

Reference numeral 2 denotes a cassette-in switch which supplies the system controller 1 with a signal as to whether or not a video cassette is loaded. Reference numeral 4 denotes a display portion which displays for example the frame code, time code, etc. of the subcode read from the magnetic tape 9 by the rotating head 8.

Reference numeral 12 denotes a data processing portion having a video subcode processing portion 12a, a decoder 12b, and an encoder 12c. In the recording mode with the switch SW1 turned to the side of recording, data such as the time code input from the system controller 1 are supplied to the encoder 12c and output from the video subcode processing portion 12a.

Then, the above data are supplied to a recording amplifier 10 through the switch SW2 which is turned on at predetermined timing. The recording amplifier 10 supplies such data as the time code to the rotating head 8, which in turn records the data in a predetermined position of each track of the magnetic tape 9.

When normal reproduction is performed, the switch SW1 is turned to the side of reproduction. Then, data read by the rotating head 8 from the magnetic tape 9 are taken out from a reproducing amplifier 11 through the switch SW3 turned on at predetermined timing. Data corresponding to the subcode are supplied to the data processing portion 12, demodulated by the decoder 12b, and supplied to the system controller 1.

The motor control circuit 5, supplied with a control signal from the system controller 1, supplies drive signals to the drum motor 7 for driving the rotating head 8 and the capstan motor 6 for traveling the magnetic tape 9, as described above, and executes such control as to keep their speed at predetermined numbers of revolutions so that normal video/sound are output.

When reproduction at high speed is performed by operation commands from the operating portion 3 or the like, the system controller 1, accepting the operation commands or the like, supplies a control signal to the motor control circuit 5 for performing high-speed reproduction. The motor control circuit 5 supplies a drive signal to the capstan motor 6 and executes tracking control for the high-speed reproduction. In this tracking control, the rotating head 8 is controlled to scan the header portion of the record track even in the high-speed reproduction.

At the same time, the rotating head 8 reads, at high speed, subcode data, such as start ID and program number ID (PNOID(1), (2)) recorded in the subcode in the record data and the read data are supplied to the system controller 1 through the decoder 12b. Then, the system controller 1 executes various control for the processing such as cuing and searching at high speed.

In the present invention, a second time code (hour-minute) utilized when performing a superhigh-speed research is recorded in the header areas W1 and W2 of the subcode shown in FIG. 2(b) and, further, a first time code (hour-minute-second frame) is recorded in the data area by the above described circuit block through the encoder 12c, so that the search is made in two steps at high speed/low speed.

While the time code is recorded in the 5-byte long data area of the subcode as described above, when it is attempted to read the record data at high speed, sometimes it is treated as an error if this code together with the parity C1, totally 7 bytes of data, cannot be read.

Figure 5A:
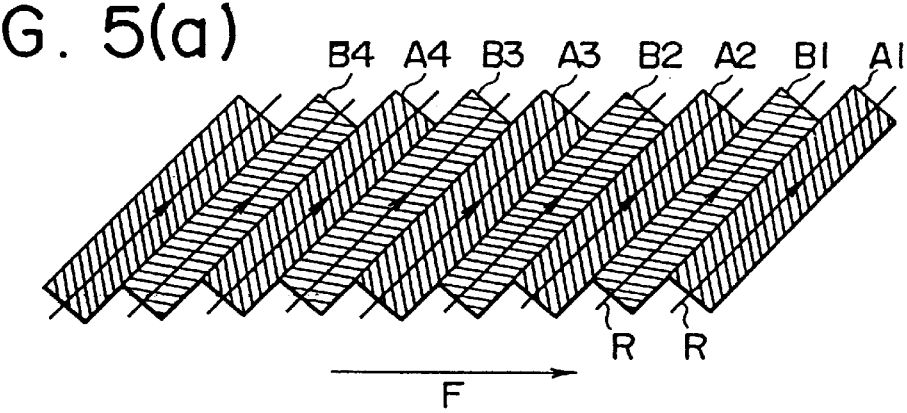
FIG. 5 is diagrams explanatory of operations on record tracks in the normal reproduction and varying-speed reproduction.
Figure 5B:
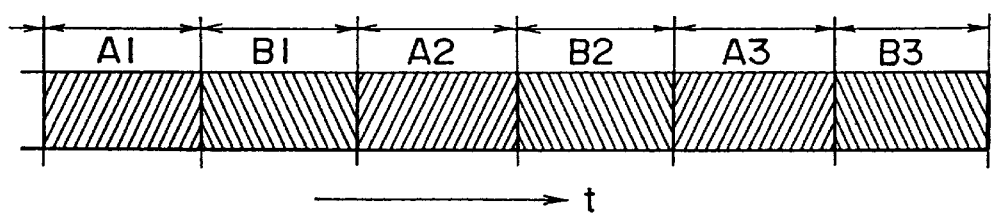
Figure 5C:
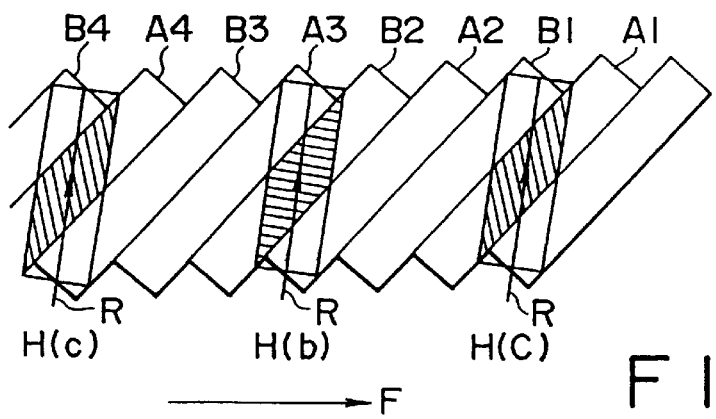
Figure 5D:
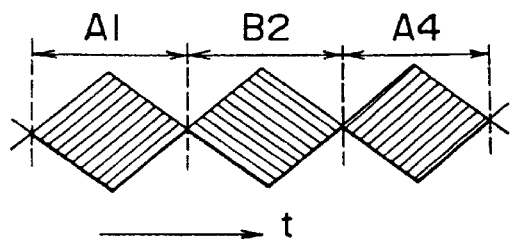

Then, by recording/reading the second time code (time-minute) in or from the header areas W1 and W2 having a smaller data length than the above data area, it can be read in the high-speed data reading even when the waveform of the RF output becomes as shown in the above described FIG. 5(b) because of skipping in reading of the tracks, decrease in the abutting surface of the rotating head 8 on each of the record tracks, and the like.

As described above, the second time code according to the present invention is adapted to be recorded/reproduced in or from the header areas W1 and W2 of the subcode. FIG. 2(c) shows the format of the header areas W1 and W2 in relation to their bit structure.

The header area W1 is divided into areas of subcode ID, R TYPE, and block address, of which the subcode ID, together with the subcode ID in the header area W2, forms data. In the R TYPE, information as to whether or not the recorded data is for example an audio signal, a video signal, or the like, is recorded.

The data in the header areas W1 and W2 described in FIG. 2(c) are repeatedly recorded, as shown in FIG. 2(d), for sync blocks $SB_1$, $Sb_2$, and $Sb_3$. In the present invention, for example the timing of the sync block $Sb_3$ is used and the second time code in hour-minute units is recorded/reproduced by the time ID(1) and time ID(2).

Since the second time code, in this case, is used in the reading of data during the high-speed searching, it is enough if data in hour-minute units can be read. Therefore, units of seconds of the time data or the frame data are not recorded. The time ID(1) and the time ID(2) are formed of 10 bits in all and, hence, time codes in hour-minute units at least for 17 hours can be recorded.

At the same time as broadcast program or program of music is recorded through the rotating head 8, data are recorded such that the second time code in hour-minute units is recorded in the header areas W1 and W2 and the first time code in hour-minute-second frame units is recorded in the data area through the encoder 12c. The second time code in hour-minute units recorded in the header area and the data in the units of hours and minutes of the first time code in hour-minute-second frame units recorded in the data area are the same.

Below will be described an outline of the high-speed search of the data recorded in the magnetic tape 9 with reference to FIG. 3. FIG. 3 is a timing chart showing the relationship between the searching speed in the high-speed search and the current position of the magnetic tape 9.

In this diagram, the axis of abscissas X indicates the traveling direction of the magnetic tape 9 and also shows transition of the time code. The point a on the axis of abscissas X represents the current position of the magnetic tape 9 on which the rotating head 8 is abutting and the point b represents the cuing point input from the operating portion 3 or the like which indicates the target position desired by the user.

The position n located between the current position a and the target position b is the speed-change position at which the high-speed search changes to the low-speed search. While the speed-change position n can be set at any desired position, it is preferred that the speed-change position n is set in a position about one minute before the target position b.

Figure 4:
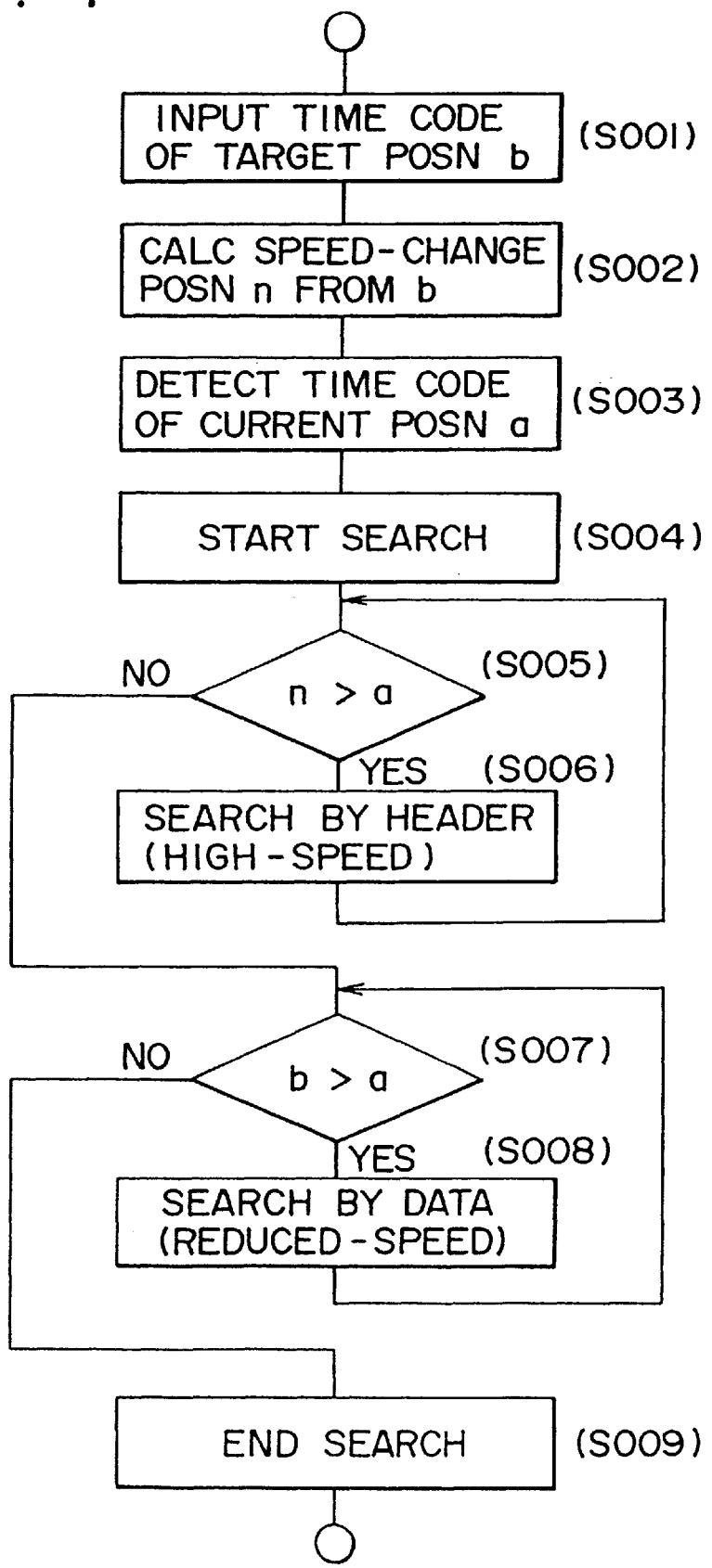
FIG. 4 shows a flow chart in making a search according to the first and second time codes recorded in the subcode.

FIG. 4 is a flowchart showing operations for executing the speed control shown in FIG. 3. The flow of processes in doing the search will be described below according to this flow chart.

First, the user input the target position b (S001) and then calculates, from the input target position b, the speed-change position n where the speed changes to the low searching speed (S002). Then, the address of the current position a is detected (S003) and the high-speed search is started (S004).

When the search is started, the system controller 1 controls the motor control circuit 5 so that a fast forwarding device for driving the magnetic tape 9 at high speed is driven and, during this fast forward operation, the second time code recorded in the header area W1 and W2 of the subcode is read through the decoder 12b. Then, the time codes of the current position a and the speed-change position n are compared (S005), and, while the current position a is smaller than the speed-change position n, the high-speed search is performed according to the second time code (hour-minute) recorded in the header area of the subcode (S006).

When the speed-change position n is reached in the high-speed search, the object of comparison of the current position a is changed to the target position b, and the system controller 1 controls the motor control circuit 5 so that the speed is reduced to such a speed as to allow the first time code (hour-minute-second frame) recorded in the data area of the subcode to be read.

Then, the current position a and the target position b are compared (S007) and the reduced-speed search is carried out until the current position a reaches the target position b, with the time code (hour-minute-second frame), recorded in the data area of the subcode, read through the decoder 12b (S008). When the current position a has reached the target position b, the system controller 1 controls the motor control circuit 5 to stop the magnetic tape 9 (S009).

In the case where the speed-change position n is set in a position one minute before the target b, then, when the current position a is within about one minute of the target position b desired by the user, the setting of the speed-change position n may be omitted and the high-speed search (S006) may not be made, but the reduced-speed search (S008) only may be carried out.

By having the second;time code (hour-minute) recorded in the header area of the subcode as described above, it has become possible to have speed control executed according to the second time code (hour-minute) recorded in the header area during the high-speed search, and according to the first time code (hour-minute-second frame) recorded in the data area during the low-speed search, to thereby achieve searching at higher speed than before.

While, in the description of the embodiment above, the case where the present invention is applied to a magnetic recording and reproducing apparatus has been described, the art of the present invention can also be applied to the case where recording and reproduction are separately performed in independent, dedicated apparatuses. Further, instead of the first time code/second time code, it is possible to use first address information and second address information, which represents high-order data of the first address information.

Since the magnetic recording apparatus and reproducing apparatus of the invention, as described above, are adapted to record a second time code (hour-minute) in the header area of the subcode which can be read even during the varying-speed reproduction, it is made possible to make a high-speed search by using the second time code, for example in the edition of recorded data.

Further, even when there is recorded no cuing signal such as a start ID, a search for a desired position can be achieved by having the second time code recorded as described above.

What is claimed is:

1. A magnetic recording apparatus for forming oblique tracks in succession on a magnetic tape and recording input digital data along said tracks with a rotating head, each track having a data portion comprised of a plurality of subcode sections, each subcode section having a header portion and a subcode data area, the apparatus comprising:

subcode generation means for generating first and second address information codes for each subcode section; each first address information code having high-order data and low-order data; each second address information code containing only the same high-order data as the corresponding first address information code; and record means for recording each first address information code into the subcode data area of the corresponding subcode section and each second address information code into the header portion of the corresponding subcode section; said first address information code for use in conducting normal speed searches of the recorded data and said second address information code for use in conducting high speed searches of the recorded data.

2. A magnetic recording apparatus according to claim 1, wherein said first and second address information codes are time codes.

3. A magnetic reproducing apparatus capable of reading out reproduced data with a rotating head from oblique tracks formed on a magnetic tape, wherein each track has a data portion comprised of a plurality of subcode sections, each subcode section having a header portion and a subcode data area, the apparatus comprising:

subcode detection means for detecting a first address information code having both high-order data and low-order data and being recorded in the subcode data area of each subcode section, and for detecting a second address information code always containing only the same said high-order data as the first address information code of the corresponding subcode section and being recorded in the header portion of each subcode section; and control means for performing, when making a search for data recorded on said magnetic tape at high speed, a high-speed search up to a predetermined position according to the reproduced data of said second address information code and a normal speed search from said predetermined position to a desired position according to the reproduced data of said first address information code.

4. A magnetic reproducing apparatus according to claim 3, wherein said first and second address information codes are time codes.

* * * * *